United States Patent
Daoud et al.

(10) Patent No.: US 12,332,340 B2
(45) Date of Patent: Jun. 17, 2025

(54) SYSTEM AND METHOD FOR INSTALLATION OF TRAIN DETECTION APPARATUS

(71) Applicant: Charter Communications Operating, LLC, St. Louis, MO (US)

(72) Inventors: Mohamed Daoud, Englewood, CO (US); Hany Heikal, Aurora, CO (US); Vishal G. Chopade, Denver, CO (US); Hossam Hmimy, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 427 days.

(21) Appl. No.: 17/960,248

(22) Filed: Oct. 5, 2022

(65) Prior Publication Data
US 2024/0118409 A1    Apr. 11, 2024

(51) Int. Cl.
| | |
|---|---|
| *G01S 13/86* | (2006.01) |
| *B61L 25/02* | (2006.01) |
| *G01B 21/24* | (2006.01) |
| *G01S 13/88* | (2006.01) |
| *G06V 20/50* | (2022.01) |
| *H04N 23/695* | (2023.01) |
| *H04N 23/698* | (2023.01) |

(52) U.S. Cl.
CPC .......... *G01S 13/867* (2013.01); *B61L 25/023* (2013.01); *G01B 21/24* (2013.01); *G01S 13/88* (2013.01); *G06V 20/50* (2022.01); *H04N 23/698* (2023.01)

(58) Field of Classification Search
None
See application file for complete search history.

(56) References Cited

U.S. PATENT DOCUMENTS

| | | | | |
|---|---|---|---|---|
| 7,545,313 | B2* | 6/2009 | Okamura | G01S 7/4026 342/174 |
| 7,715,276 | B2* | 5/2010 | Agam | B61L 29/30 367/96 |
| 2007/0102592 | A1* | 5/2007 | Ashton | B61L 5/1872 246/473 R |
| 2010/0231414 | A1* | 9/2010 | Ballinger | B61L 29/30 340/686.2 |
| 2014/0151512 | A1* | 6/2014 | Cooper | B61L 5/18 246/1 C |
| 2015/0301159 | A1* | 10/2015 | Scheschko | G01S 7/4026 342/174 |

(Continued)

*Primary Examiner* — Bernarr E Gregory
(74) *Attorney, Agent, or Firm* — Young Basile Hanlon & MacFarlane, P.C.

(57) ABSTRACT

Methods and systems for train detection apparatus angle alignment is described. A train detection system includes a train detection apparatus configured for installation at an installation site at a defined angle with respect to railroad tracks and a processor configured to execute a method for aligning the train detection apparatus to the defined angle. The processor configured to determine a railroad tracks angle with respect to a reference angle based on an image captured of the installation site, obtain, from a sensor, a train detection apparatus angle with respect to the reference angle, determine an alignment angle based on the railroad tracks angle and the train detection apparatus angle, and send the alignment angle to substantially align the train detection apparatus to the railroad tracks in accordance with the defined angle.

20 Claims, 14 Drawing Sheets

(56) References Cited

U.S. PATENT DOCUMENTS

2016/0214631 A1\* 7/2016 Hammerl .............. B61L 25/021
2018/0238740 A1\* 8/2018 Christel ............... H04N 25/671
2022/0242467 A1   8/2022 Guibene et al.

\* cited by examiner

SYSTEM AND METHOD FOR INSTALLATION OF TRAIN DETECTION APPARATUS

TECHNICAL FIELD

This disclosure relates to transportation safety and management. More specifically, this disclosure relates to installation of train detection apparatus on a pole for real-time detection and reporting of trains.

BACKGROUND

Many municipalities have issues with trains passing through their region. These issues include blocked intersections, traffic delays, and other related inconveniences. This is especially true when the trains are long haul trains which can be ½ to 1 mile in length. The municipalities are not informed by the train operators of when the trains will be in their region or the length of the train. Consequently, the municipalities are unable to be proactive in traffic management.

SUMMARY

Disclosed herein are methods and systems for installation of train detection apparatus used for real-time detection and reporting of trains. In implementations, a train detection system includes a train detection apparatus configured for installation at an installation site at a defined angle with respect to railroad tracks and a processor configured to execute a method for aligning the train detection apparatus to the defined angle. The processor configured to determine a railroad tracks angle with respect to a reference angle based on an image captured of the installation site, obtain, from a sensor, a train detection apparatus angle with respect to the reference angle, determine an alignment angle based on the railroad tracks angle and the train detection apparatus angle, and send the alignment angle to substantially align the train detection apparatus to the railroad tracks in accordance with the defined angle.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
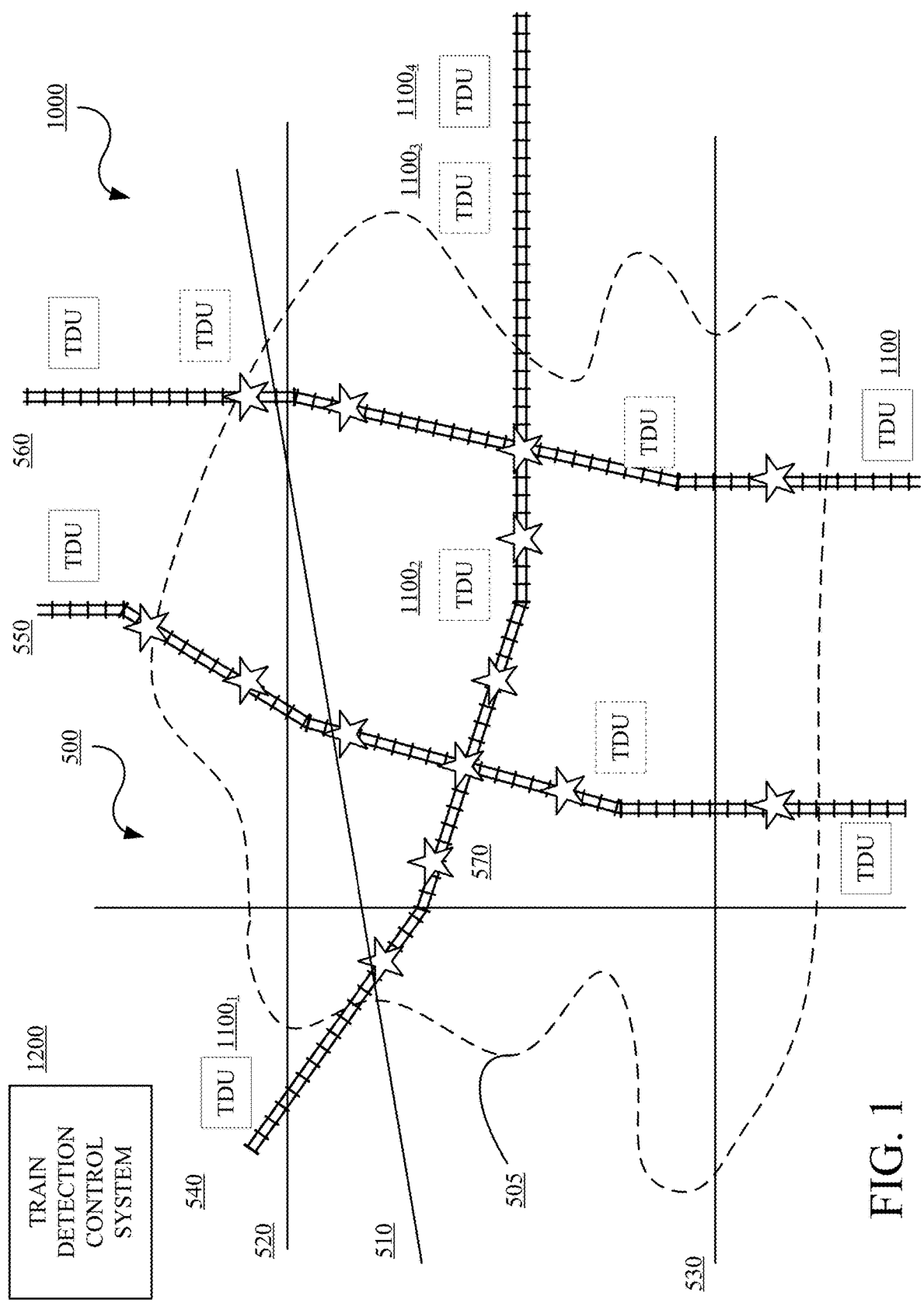
FIG. 1 is a diagram of an example train detection system deployed in an environment in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system or platform" includes any unit, or combination of units, capable of performing any method, or any portion or portions thereof, disclosed herein. For example, the "server", "computer", "computing device or platform", or "cloud computing system or platform" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, travel scheduling and management, smart home management, entertainment, installation parameters and alignment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Disclosed herein are methods and systems for installation of train detection apparatus for real-time detection of trains. In implementations, a train detection unit is deployed which detects trains entering a municipality, determines the train speed, provide information to determine intersection arrival time estimates, and determine other train related information such as potential stops. Multiple train detection units can be deployed to provide train progress and updates and to correlate train information between different train detection units. A control system can use the train information to manage traffic, route emergency vehicles, and other such activities.

The train detection unit can include train detection apparatus, such as but not limited to, radars and cameras which are installed on telephone polls or other similarly situated structures at a defined height above the ground and at a defined angle relative to train or railroad tracks. In some implementations, the control system and/or the train detection unit can use computer vision techniques to determine, from an image obtained of an installation site which includes railroad tracks, an angle of the railroad tracks relative to true north. In some implementations, sensors implemented with, in, and/or co-located with the train detection apparatus can provide a position of the train detection apparatus and an angle relative to true north. The control system and/or the train detection unit can determine, using the defined angle, the angle of the railroad or train tracks (train tracks), and the angle of the train detection apparatus, an alignment, resultant, or calibration angle which the train detection apparatus has to be moved to substantially calibrate the train detection apparatus to the defined angle.

In some implementations, the radar in the train detection apparatus can include an actuator, a stepper motor, and/or similar mechanism to move the radar in accordance with the resultant angle. In some implementations, the camera in the train detection apparatus can include an actuator, a stepper motor, and/or similar mechanism to move the camera in accordance with the resultant angle. In some implementations, the camera in the train detection apparatus can include an actuator, a stepper motor, and/or similar mechanism to move the camera in accordance with the resultant angle. In some implementations, the camera in the train detection apparatus can be aligned to the radar. In some implementations, a focal length of the camera in the train detection apparatus can include a moveable lens which can be moved after calibration is completed.

In some implementations, a user device and an application running on the user device can use a graphical user interface and display to provide a visualization of the train detection apparatus, the train tracks, and the resultant angle. A user can move the radar in the train detection apparatus in accordance with the displayed resultant angle to substantially align the radar with the train tracks with respect to the defined angle. In some implementations, the user device can use visible, audible, haptic, vibratory alerts, and/or combinations thereof to alert a user of alignment.

In some implementations, a user device can stream image or video data from the camera as focal length is adjusted to aid in setting of the focal length.

In some implementations, the user device can be a mobile device used by a user at the installation site, a computing device at a remote location, and/or combinations thereof. Inclusion of the automated angle determination and stepper motors enables any person to operate the calibration process remotely.

The system and methods described herein can reduce the time needed to install apparatus and eliminate human error by automating tasks and relying less on manual steps.

FIG. 1 is a diagram of an example train detection system 1000 deployed in an environment in accordance with embodiments of this disclosure. In some implementations, the environment can be a municipality 500, including but not limited to, a city, town, or the like, having a municipality border 505. The municipality 500 includes one or more streets 510, 520, and 530 which intersect with one or more railroad tracks 540, 550, and 560 which run through the municipality 500. Each of the railroad tracks 540, 550, and 560 can have one or more stops 570 (denoted as a star) in the municipality 500. The train detection system 1000 is described in U.S. Patent Application Publication No. 20220242467 entitled "SYSTEM AND METHOD FOR REAL-TIME DETECTION OF TRAINS" and filed on Feb. 2, 2021, the contents of which are incorporated herein by reference as if set forth in its entirety.

The train detection system 1000 can include train detection units (TDUs) 1100 which are deployed prior to the one or more railroad tracks 540, 550, and 560 cross the municipality border 505. For example, railroad tracks 540 includes TDUs 11001, 11002, 11003, and 11004. The TDUs 1100 are in communication with or connected to (collectively "in communication with") a train detection control system 1200. The number of TDUs deployed can depend on the train detection system 1000 deployed in the municipality, the number of railroads tracks, the number of stations, and the like.

In some implementations employing an active device co-located with the train, the number of TDUs can be minimized to two TDUs, one TDU at each municipality border 505 intersection point. In implementations, the active device can be a drone, an electromagnetic device, and the like. The municipality border 505 intersection point TDUs are positioned sufficiently distant from the municipality border 505 to enable traffic management and alerts to be circulated or transmitted. Placement of TDUs at locations other than municipality border 505 intersection points can increase measurement resolution and confirmation. The train detection control system 1200 can be a cloud-based system, centralized computing system, distributive computing system, and the like. The train detection control system 1200 communicates information to appropriate entities in the municipality 500. The train detection system 1000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

Figure 2:
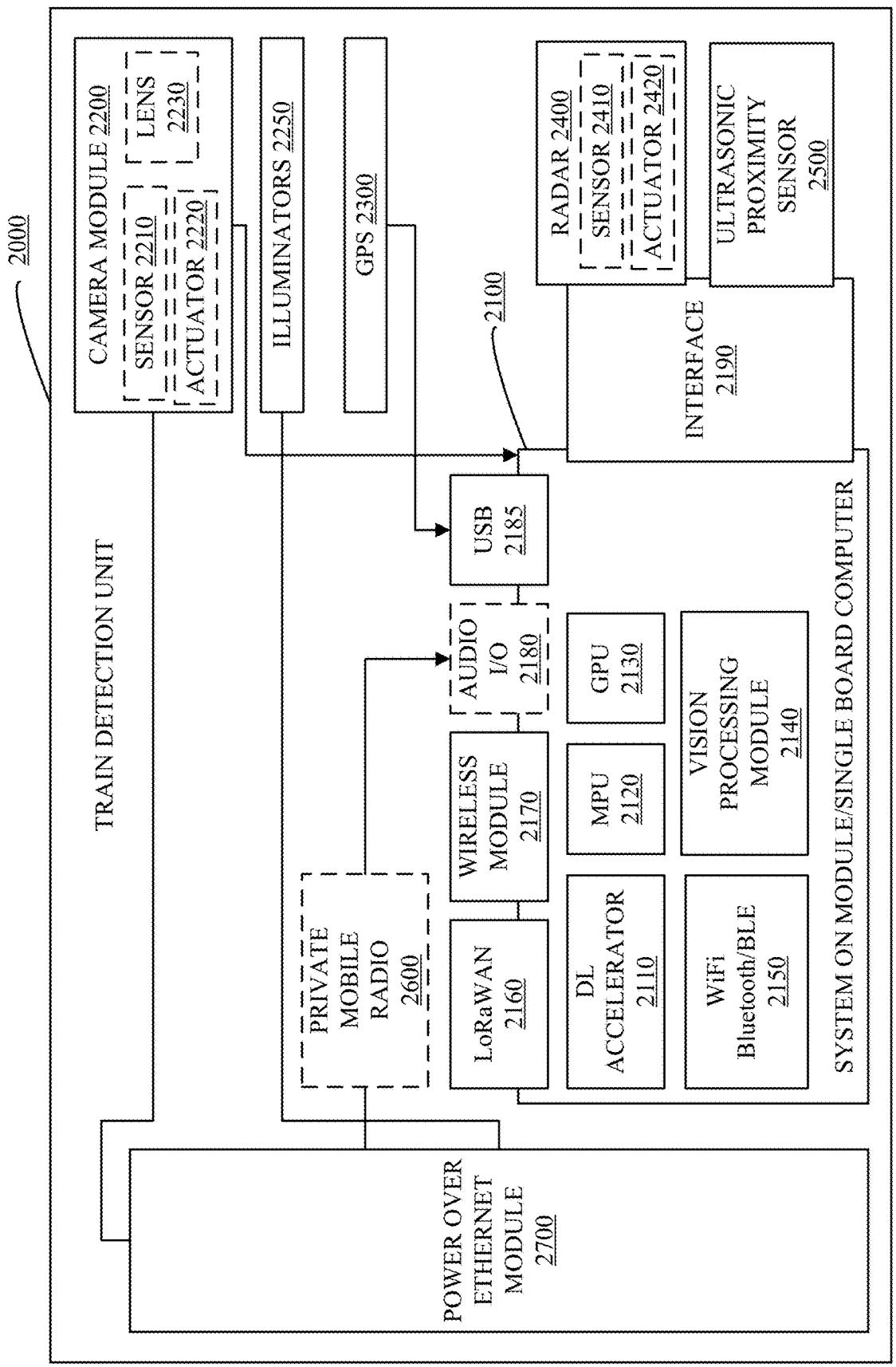
FIG. 2 is a diagram of an example train detection unit in accordance with embodiments of this disclosure.

FIG. 2 is a diagram of an example train detection unit (TDU) 2000 in accordance with embodiments of this disclosure. The TDU 2000 can include sensors, communication devices, platforms, protocols, and/or systems, and computing platforms to detect, classify, determine, and communicate train information to a train detection control system or unit such as the train detection control system 1200. The TDU 2000 can include a system on module (SOM)/single board computer (SBC) 2100 (collectively "SOM 2100"). The SOM 2100 can include computing platforms such as a deep learning accelerator 2110, a microprocessor 2120, a graphics processing unit 2130, and a vision processing module 2140, for example. The SOM 2100 can include communication platforms such as Wi-Fi® (which is a wireless network protocol), Bluetooth® (which is short-range wireless technology), and/or Bluetooth® Low power Enable (BLE) components 2150, a low-power wide-area network (LPWAN) protocol 2160 such as Long Range WAN (LoRaWAN), and a wireless module 2170, for example. The SOM 2100 can include interfacing modules such as an audio input/output (I/O) module 2180, a Universal Serial Bus (USB) port 2185, and an interface module 2190. The TDU 2000 can include sensors such as a camera module 2200, illuminators 2250, a GPS 2300, a radar module 2400, and an ultrasonic proximity sensor 2500. In some implementations, the TDU 2000 can include a Private Mobile Radio or Professional Mobile Radio (PMR) 2600. The TDU 2000 can be powered using a power over Ethernet module 2700. The TDU 2000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

In some implementations, the deep learning accelerator 2110 can be a dedicated accelerator to execute a convolutional neural network (CNN) for purposes of image classification as described herein.

In some implementations, the microprocessor 2120 can be a computer, computing device, and/or processor along with memory. In implementations, the graphics processing unit 2130 can be used to implement CUDA cores, Tensor cores, and/or combinations thereof. In implementations, the vision processing module 2140 can be a vision accelerator or processor.

In some implementations, the Wi-Fi® Bluetooth®, and/or Bluetooth® Low power Enable (BLE) components 2150, the low-power wide-area network (LPWAN) protocol 2160 such as Long Range WAN (LoRaWAN), and the wireless module 2170 enable the TDU 2000 to transmit or communicate information to the train detection control system. In some implementations, the ultrasonic proximity sensor 2500 can detect up to 10 meters away. In some implementations, the GPS 2300 can provide the location of the TDU 2000.

In some implementations, the camera module 2200 can be a pan, tilt, and zoom (PTZ) camera or the like. In some implementations, the camera module 2200 can include a sensor 2210 configured to provide a tilt and angle of the camera module 2200. In some implementations, the camera module 2200 can include an actuator 2220 which can be electromechanically controlled using control signaling sent via wired, wireless, and/or combinations thereof communications. In some implementations, the actuator 2220 can be a stepper motor. In some implementations, the camera module 2200 can include a lens or optical component 2230 which can be electromechanically controlled using control signaling sent via wired, wireless, and/or other communications means. In some implementations, the actuator 2220 can be a stepper motor.

In some implementations, the radar module 2400 can be a 24 GHz radar. In some implementations, the radar module 2400 can include a sensor 2410 configured to provide a tilt and angle of the radar module 2400. In some implementations, the radar module 2400 can include an actuator 2420 which can be electromechanically controlled using control signaling sent via wired, wireless, and/or combinations thereof communications. In some implementations, the actuator 2420 can be a stepper motor.

In some implementations, the PMR 2600 can be tuned to a RF channel to capture train communications or defect detector announcements transmitted by trains each time it passes a train defect detector sensor or module. The captured audio samples can be transcribed using automatic speech recognition techniques to extract train information such as hot box (where a wheel bearing runs out of grease and heats up), axle count (used for determining number of train cars and any missing train cars, dragging equipment (is something dragging under or alongside), speed (does reported speed agree with your instrumentation), excessive height or width to protect bridges, tunnel entrances, and other structures with restricted clearances near the tracks, load shift, and/or other train defect information.

Figure 3:
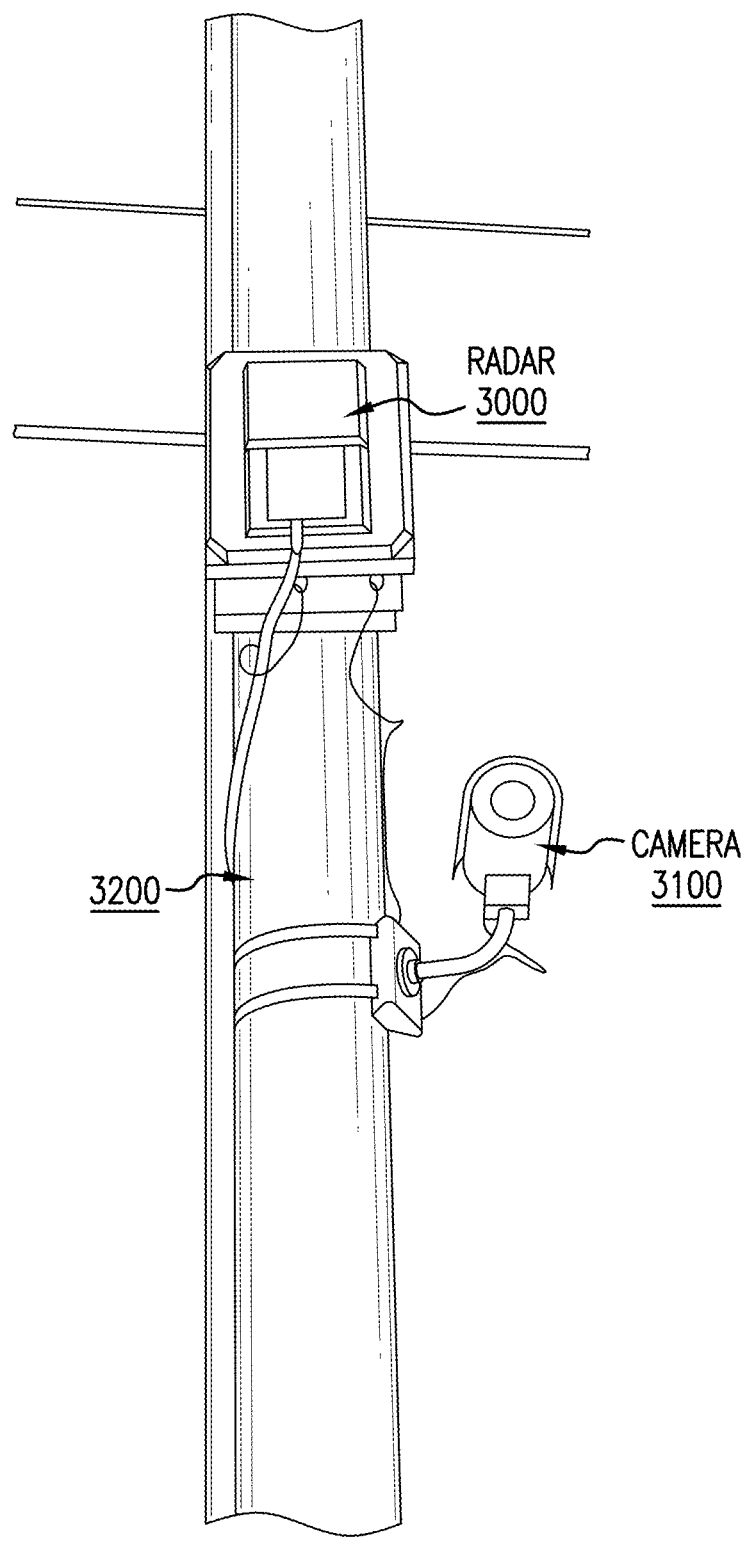
FIG. 3 is a diagram of an example radar and camera in a train detection unit in accordance with embodiments of this disclosure.
Figure 4:
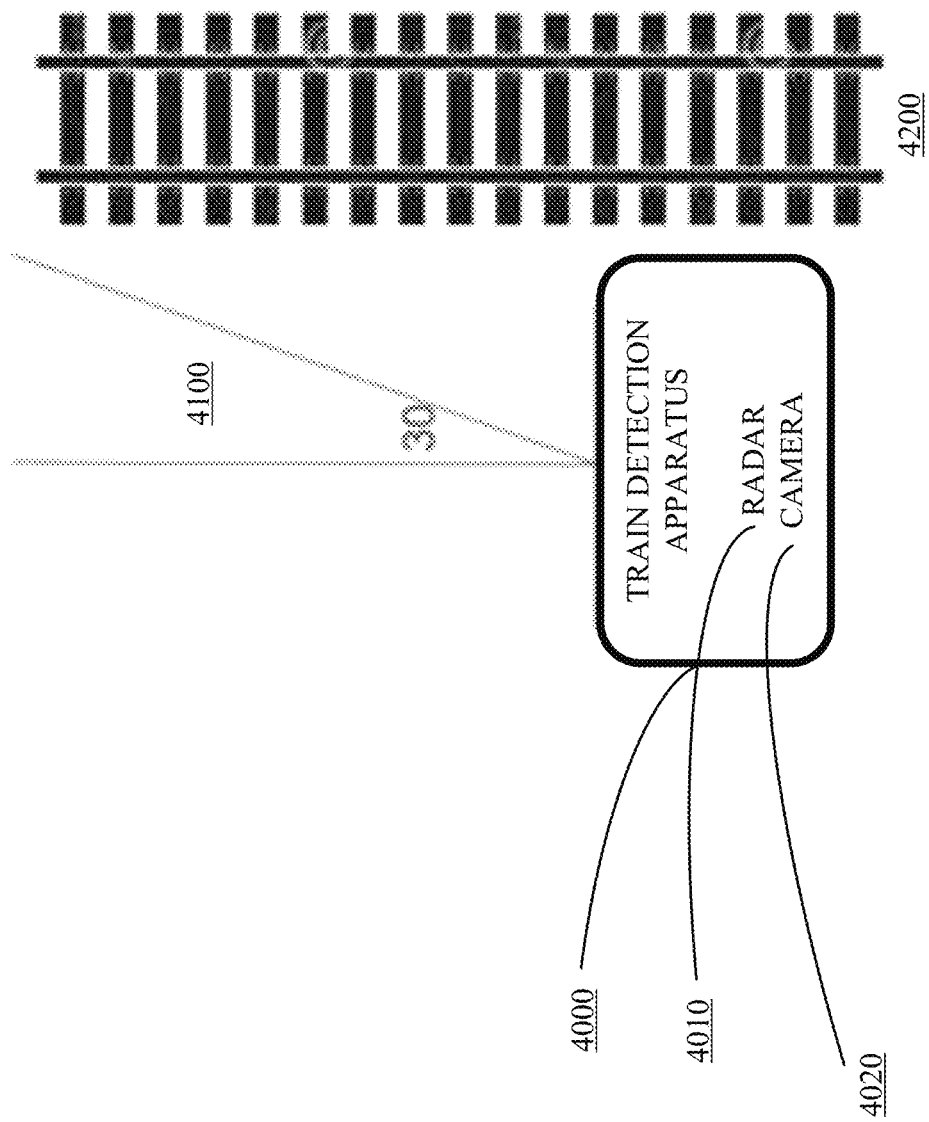
FIG. 4 is a block diagram of angles relevant to train detection in accordance with embodiments of this disclosure.

FIG. 3 is a diagram of an example radar 3000 and camera 3100 in a train detection unit in accordance with embodiments of this disclosure. FIG. 4 is a block diagram of angles relevant to train detection in accordance with embodiments of this disclosure. As shown in FIG. 3, the radar 3000 and the camera 3100 have to be installed a defined height above the ground. In some implementations, the defined height is 20 feet. Due the height requirement, this usually means the radar 3000 and camera 3100 have to be installed on, for example, a utility pole, telephone pole, or other similarly situated structure. In FIG. 3, the radar 3000 and camera 3100 are installed on a pole 3200. Moreover, as shown in FIG. 4, train detection apparatus 4000 has to be installed at a defined angle 4100 with respect to railroad tracks 4200. In some implementations, a radar component 4010 of the train detection apparatus 4000 has to be installed at the defined angle 4100 with respect to railroad tracks 4200. In some implementations, the defined angle 4100 is substantially 30°. A camera component 4020 of the train detection apparatus 4000 may have a greater range for angle alignment due to its greater field of view in contrast to the radar component 4010.

Figure 5:
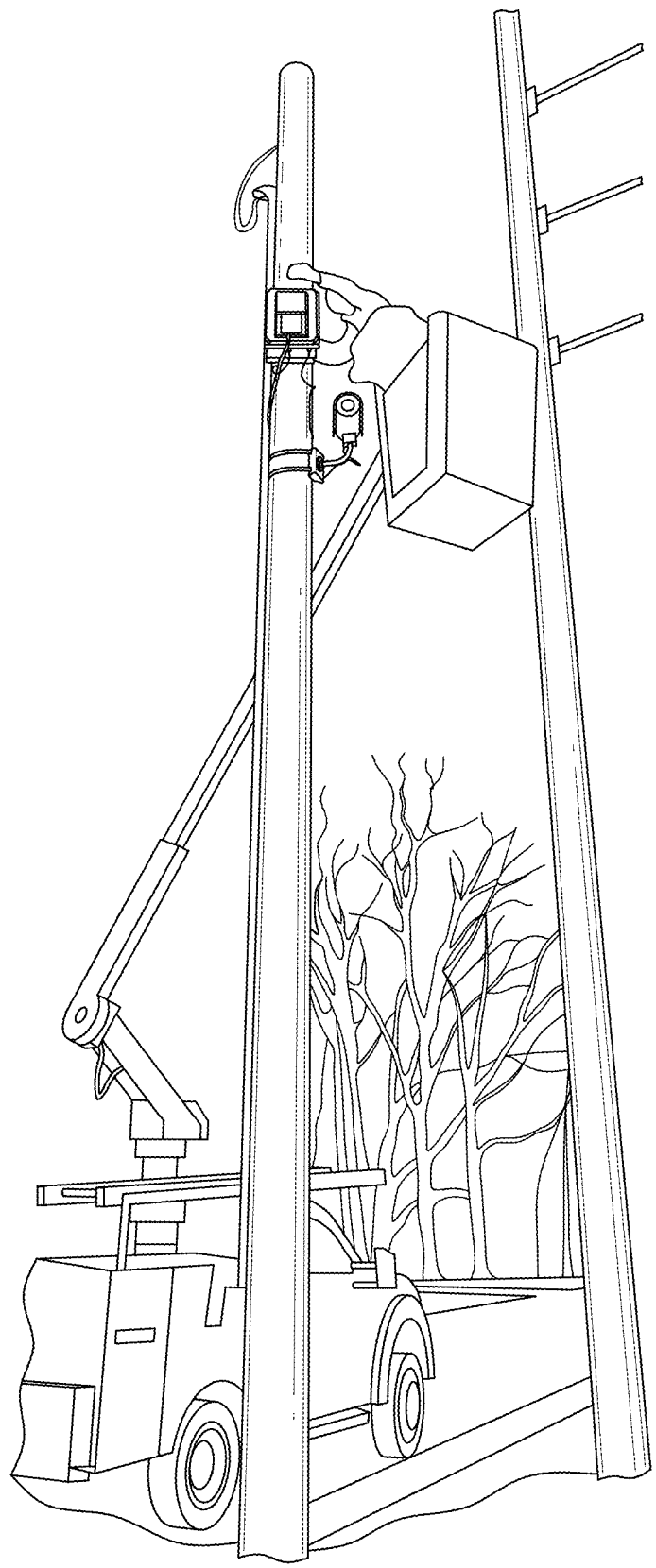
FIG. 5 is a photograph of device installation.

A previous method of installing the train detection apparatus involve several manual steps, each of which can introduce human error into the installation. A technician, using a bucket truck as shown in FIG. 5, first attaches the train detection apparatus, including the radar and the camera, at a height calculated with a height angle calculator for radar (field-of-view-calculator). As described herein, the angle of the train detection apparatus is set a defined angle from the train tracks for optimal speed value results. To calculate the angle, the technician must take an angle of the train track with reference to true north. Then the technician calculates the difference of the current angle of the train detection apparatus and subtracts the angle calculated for the train track from the current angle of the train detection apparatus. A new train detection apparatus angle is adjusted until the difference meets the defined angle to deploy the train detection apparatus successfully.

After setting the train detection apparatus at the defined angle, a frame focus or focal point needs to be set for the camera. The frame focus is critical for the camera and is calibrated manually by trying and testing the focal length for each frame in a live video feed. To get the live video feed, either a screen needs to be connected to the train detection apparatus hanging the defined height above the ground or via a wireless virtual network computing (VNC) session, which has high latency issues.

The current process has a lot of manual work, consumes a lot of time, and consumes a lot of effort, which greatly affects the scalability of the deployment. On rainy or windy days, the focal length calibration and apparatus angle adjustments can be challenging. The manual process can introduce an angle error for the radar calculation and the wrong focal length adjustment can ruin the performance of the camera, especially at night times. Moreover, once the train detection apparatus is installed on a pole there is no way to realign it remotely. This means any error in installation requires sending a technician with a bucket truck. In case the train detection apparatus alignment shifts due to strong winds, manual intervention is required to re-align it.

Figure 6:
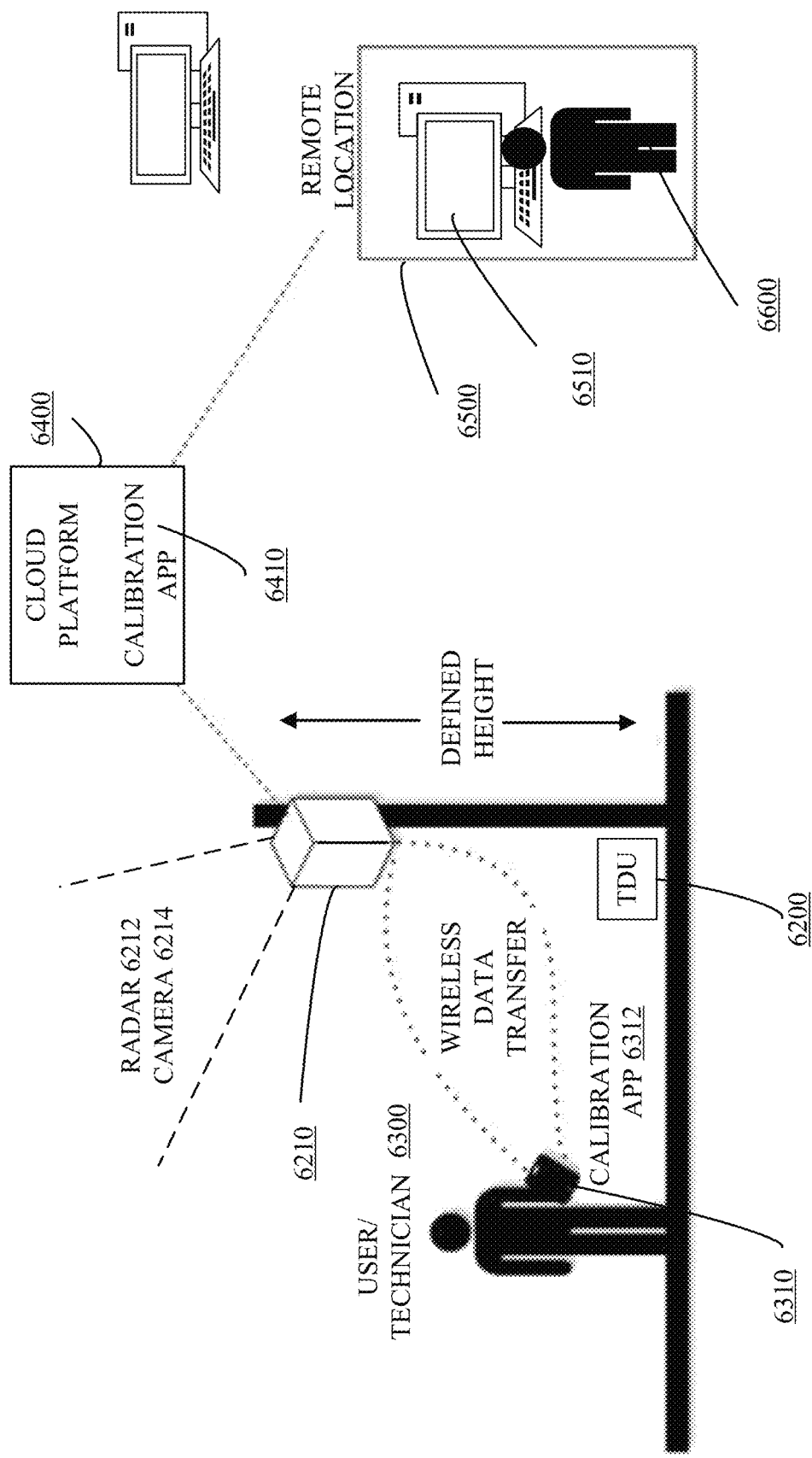
FIG. 6 is a block diagram for installation of train detection apparatus in accordance with embodiments of this disclosure.

FIG. 6 is a block diagram for installation of a train detection apparatus at an installation site 6000 in accordance with embodiments of this disclosure. The installation site 6000 can include a pole 6100, a train detection unit (TDU) 6200, and a user or technician 6300. In some implementations, the user 6300 can have a mobile device 6310, which includes a calibration application 6312. In some implementations, the calibration application 6312 can be a web-based application.

The TDU 6200 can be the train detection unit 2000 shown in FIG. 2. The TDU 6200 can include a train detection apparatus 6210, which can include a radar 6212 and a camera 6214, such as for example, the camera module 2200 and the radar 2400, respectively, as shown in FIG. 2 and/or the radar component 4010 and the camera component 4020, respectively, as shown in FIG. 4.

In some implementations, the mobile device 6310 and the calibration application 6312 can communicate with the radar 6212 and the camera 6214 via the wireless communications in the TDU 6200, such as via the wireless module 2170, the LoRaWAN 2160, and/or the Wi-Fi®/Bluetooth®/BLE 2150. The technician 6300 can observe the alignment status and provide instructions to the train detection apparatus 6210 or manually perform alignment as described herein.

In some implementations, the mobile device 6310 and the calibration application 6312 and/or the train detection apparatus 6210 can communicate with a cloud computing platform 6400, which includes a server-side calibration application 6410. The cloud computing platform 6400 and the server-side calibration application 6410 can communicate with a remote system 6500, which can be at a central or control location, such as the train detection control system 1200 of FIG. 1. Remote users 6600 can observe the alignment status and provide instructions to the technician 6300 and/or the train detection apparatus 6210 using a processor and display 6510 at the remote system 6500 as described herein.

Referring now to FIGS. 1-6, the technician 6300 can mount the train detection apparatus 6210 to the pole 6100. The technician 6300 can authenticate the mobile device 6310 to enable a connection between the train detection apparatus 6210 to the calibration application 6312 and/or to the remote system 6500 via the cloud computing platform 6400 and the server-side calibration application 6410.

The calibration application 6312 and/or the server-side calibration application 6410 can then execute the methods described herein to align the train detection apparatus 6210, the radar 6212, and/or the camera 6214. For example, the methods can include the method described in FIG. 7, the method described in FIG. 8, the method described in FIG.

Figure 11:
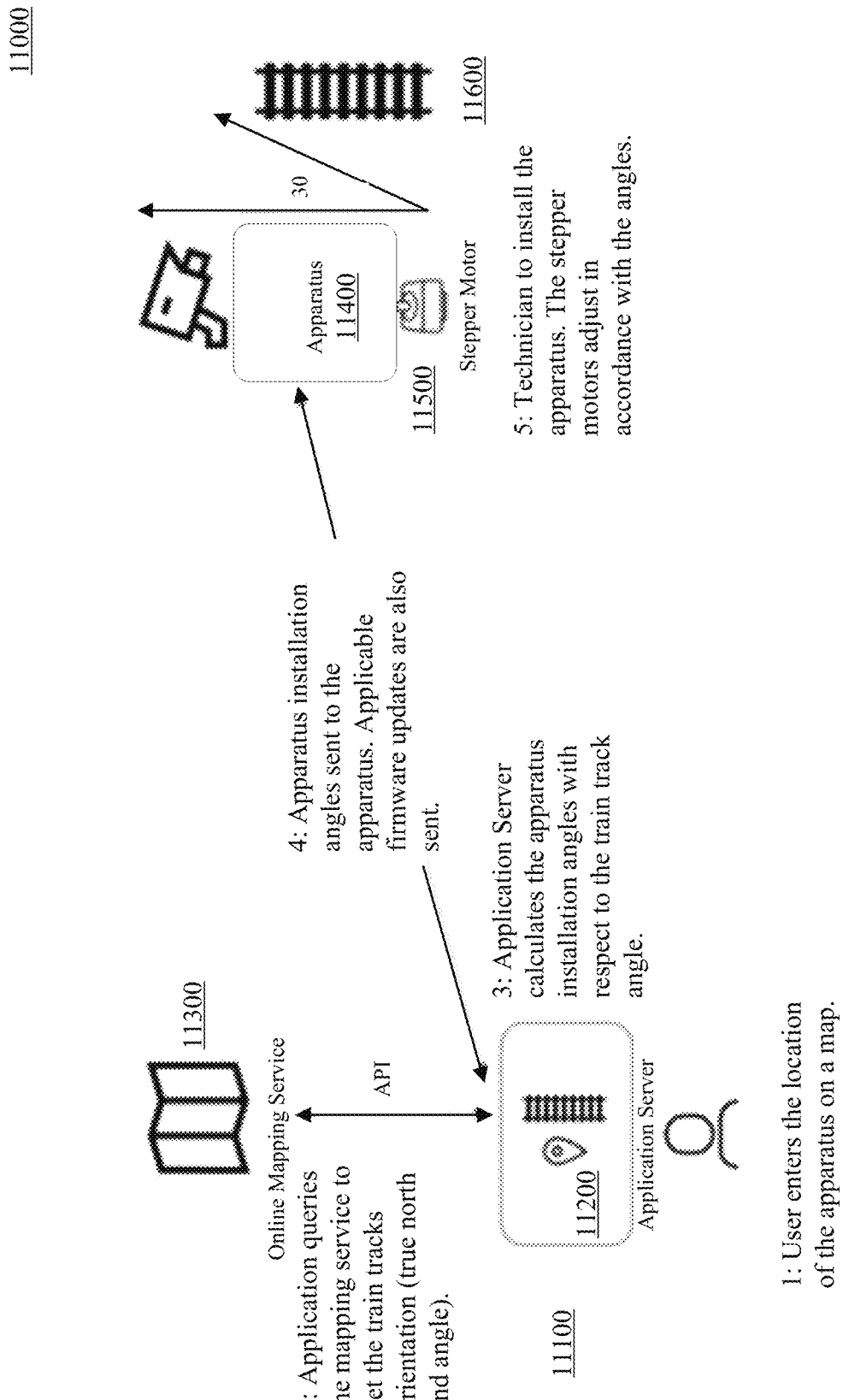
FIG. 11 is a flow block diagram for a method of installation of train detection apparatus with actuators in accordance with embodiments of this disclosure.
Figure 12:
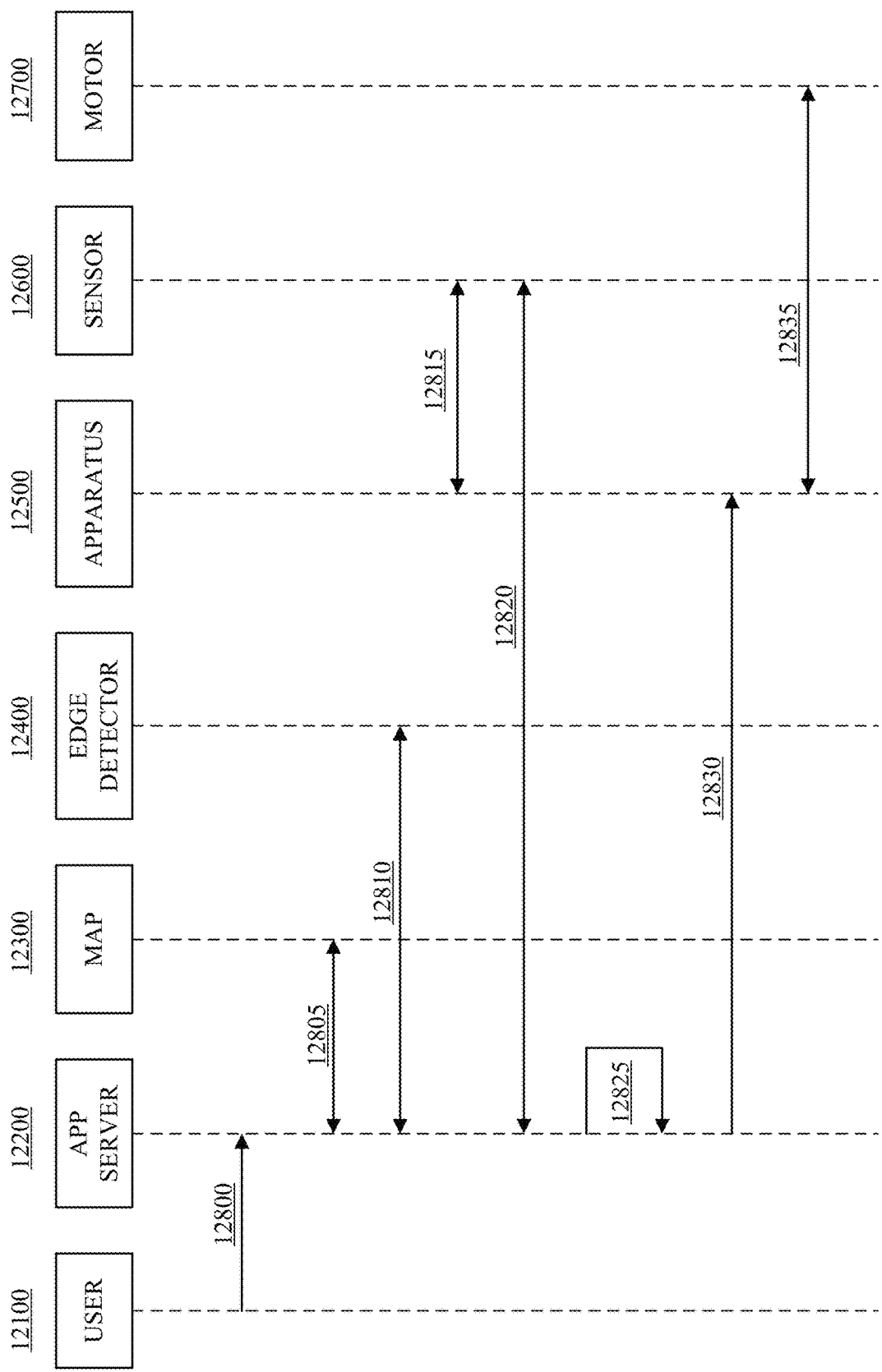
FIG. 12 is a swim diagram for installation of train detection apparatus in accordance with embodiments of this disclosure.
Figure 14:
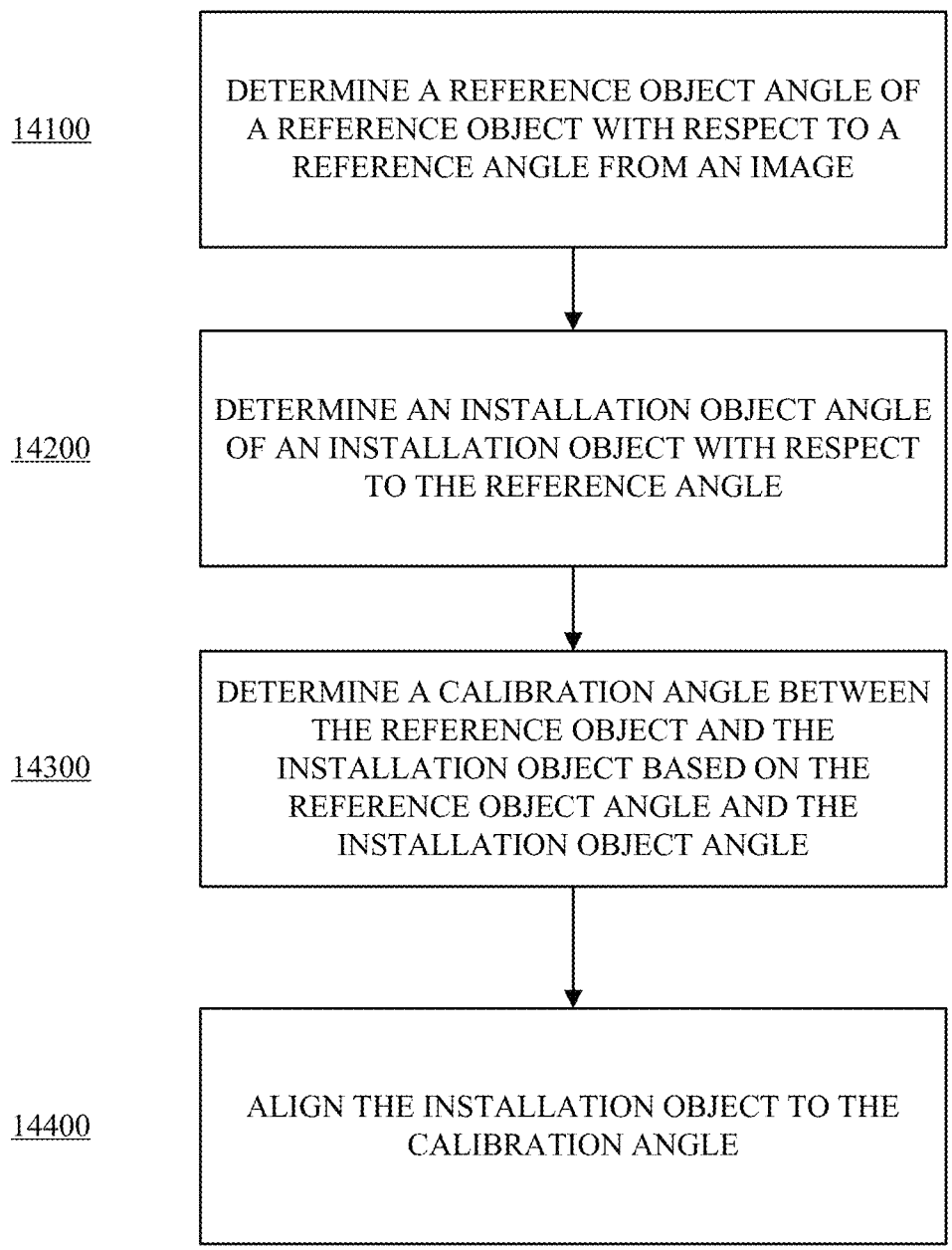
FIG. 14 is a flowchart of an example train detection apparatus installation method in accordance with embodiments of this disclosure.

10, the method described in FIG. 11, the method described in FIG. 12, the method described in FIG. 14, and/or combinations thereof.

Figure 7:
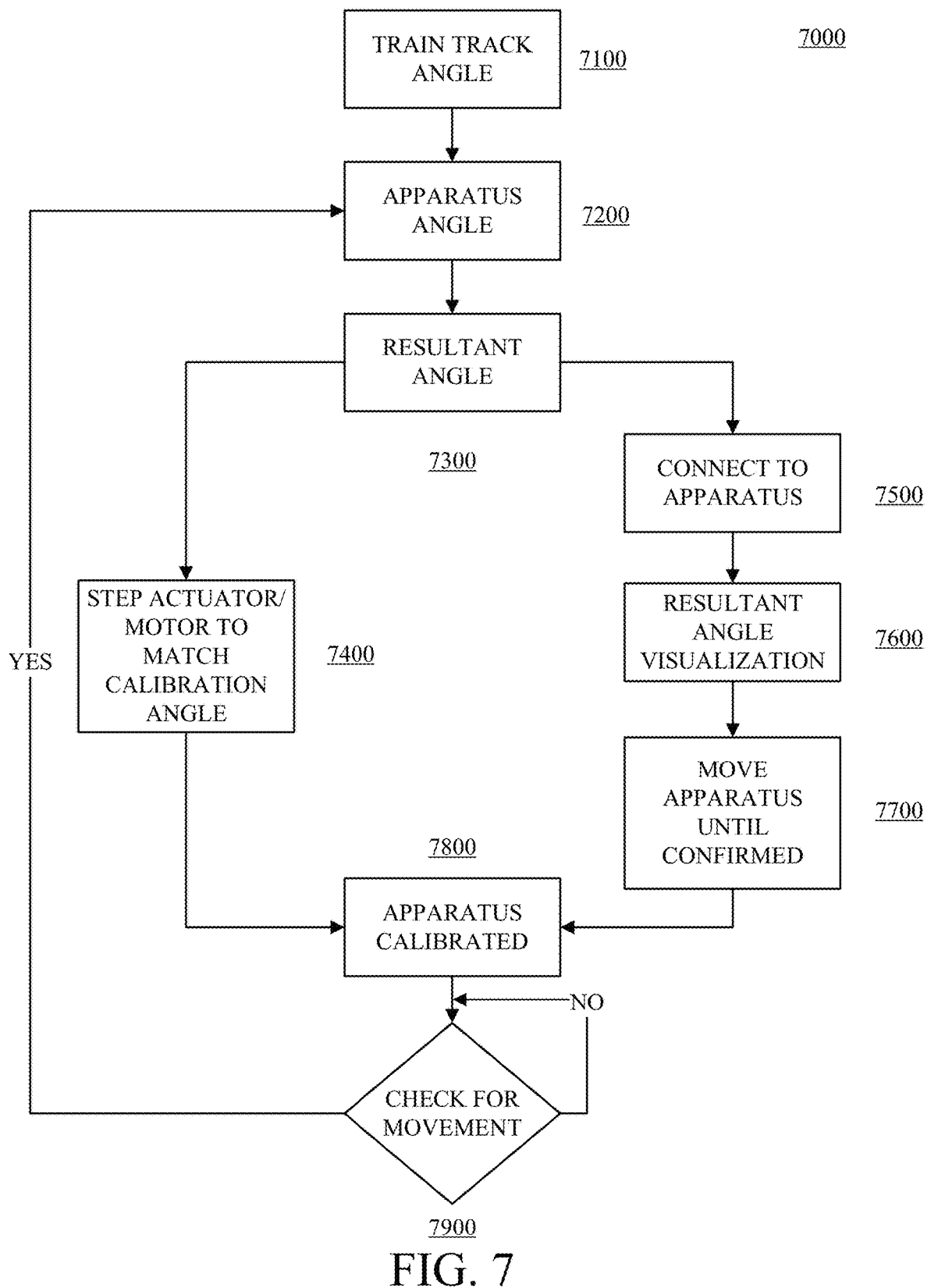
FIG. 7 is a flowchart of an example train detection apparatus installation method in accordance with embodiments of this disclosure.
Figure 8:
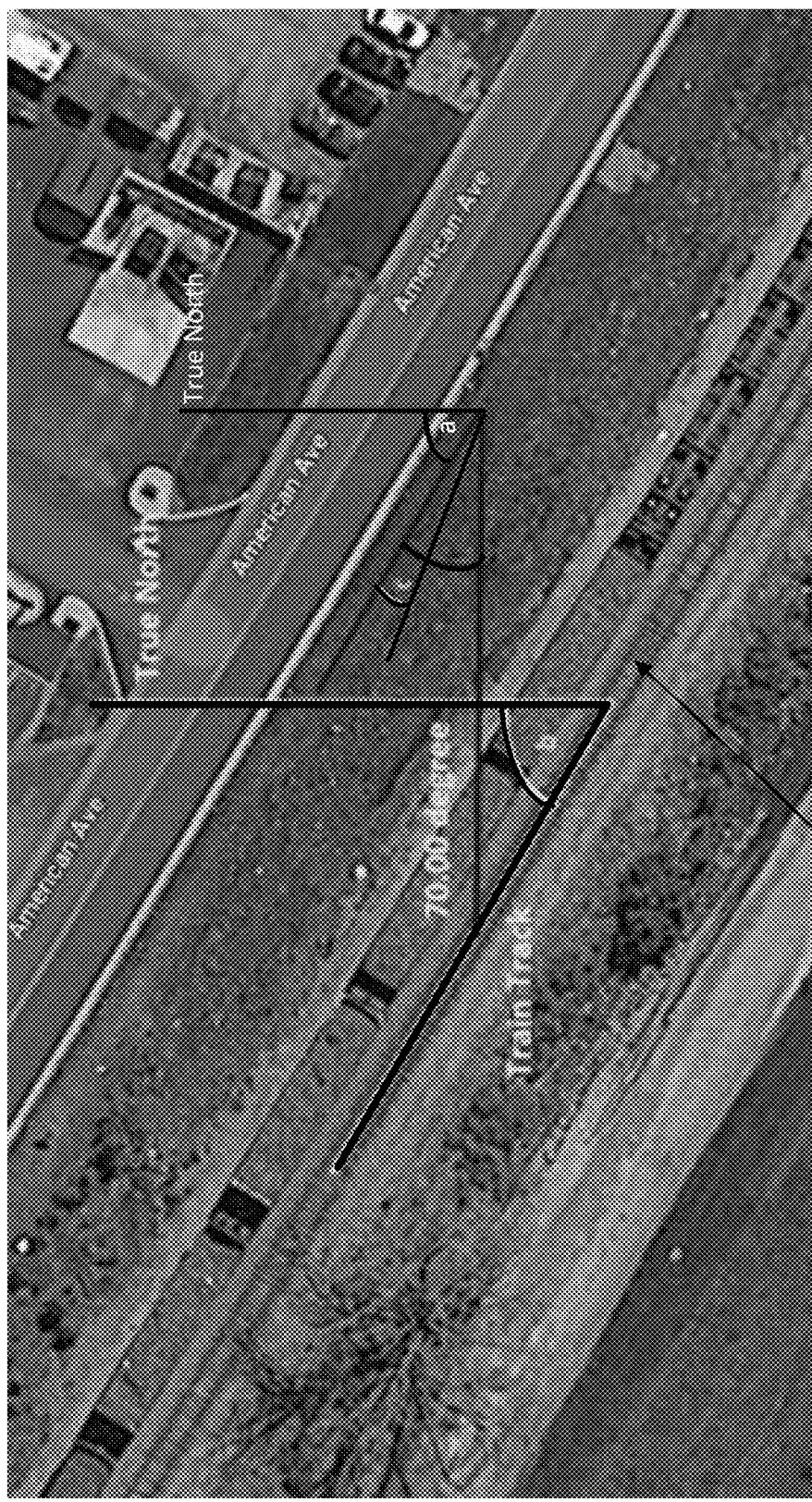
FIG. 8 is an annotated photograph for an example train detection apparatus installation method in accordance with embodiments of this disclosure.
Figure 9:
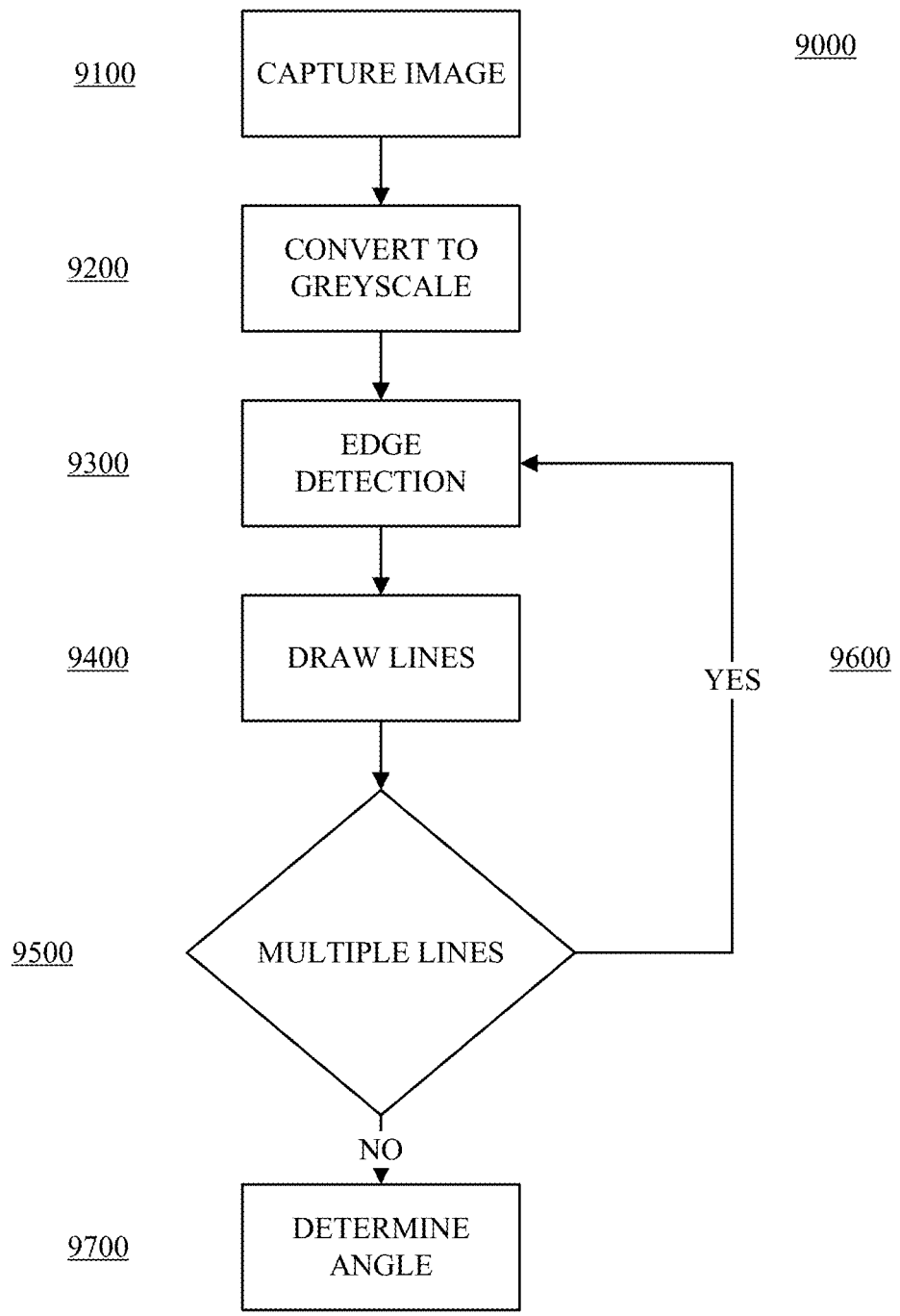
FIG. 9 is a flowchart of an example train track detection method in accordance with embodiments of this disclosure.

Referring now also to FIG. 7, an example train detection apparatus installation method 7000 is described in accordance with embodiments of this disclosure. The method 7000, in part, can be executed by the calibration application 6312 and/or the server-side calibration application 6410. The method 7000 includes determination of a train track angle (7100). A computer vision or vision processing module 2140 using OpenCV® (which is an open source computer vision library) or other similar models, applications, and/or packages (collectively "computer vision model") can upload an image of the installation site 6000. In some implementations, the image can be uploaded with online mapping tools based on coordinates of the installation site 6000. FIG. 8 is an annotated photograph of an image 8000 for an example train detection apparatus installation method in accordance with embodiments of this disclosure. The image can be processed to determine the train track angles. For example, FIG. 9 is a flowchart of an example train track detection method 9000 in accordance with embodiments of this disclosure.

Referring now to FIGS. 1-9, the train track detection method 9000 can obtain an image of the installation site 6000 as described herein (9100). The image can be converted to greyscale (9200) to enable edge detection using the computer vision model (9300). The computer vision model can draw all possible lines with collinear points using a noise threshold (9400). The number of lines detected is determined (9500). If the number of lines is greater than a defined number, the noise threshold is increased (9600) and edge detection is performed again using the computer vision model (9300). For example, the defined number for the number of lines may be between 1 or 2. For example, the defined number for the number of lines may be less than 3. For example, the defined number for the number of lines may be less than 5. The value of the noise threshold determines a level of noise processed to determine collinear points. Increasing the noise threshold can decrease the number of lines detected and increase probability of detecting the lines of interest, i.e., the train tracks. For example, if the noise threshold was initially set to a value of 0.5, the computer vision model may determine a 100 points on the image which are believed collinear. If the noise threshold is set to 1.5, the computer vision model may determine 25 points as an output. The computer vision model sets and resets the noise threshold to obtain an optimal number of lines. The computer vision model can then determine and output an angle of a detected train tracks with respect to true north (9700). This is annotated in FIG. 8 as train tracks 8000 and as angle b. The angle a is output to the calibration application 6312 and/or the server-side calibration application 6410. The described method for determining the train tracks and the angle of the train tracks saves manual intervention and is more accurate than values taken with a conventional compass. The metal train tracks can affect the compass readings for up to 10-15°. Moreover, the process can save time compared to the traditional approach of taking this angle.

Referring back to the method 7000 in FIG. 7, the calibration application 6312 and/or the server-side calibration application 6410 can obtain a train detection apparatus angle, shown as angle a in FIG. 8, from the sensor 2410 of the radar 2400 in FIG. 2 (7200). In some implementations, the sensor 2410 can be a 3-axes sensor to calculate or determine a tilt and angle of the radar 2400 absent manual intervention from the technician 6300 to determine such angle. The sensor can save time compared to the traditional approach of taking this angle. The values of angles a and b can be used to find a calibration or resultant angle to calibrate the radar 2400.

In some implementations, the calibration application 6312 and/or the server-side calibration application 6410 can determine an angle of the radar 2400 with respect to the train tracks 8000 by:

$$c = \text{MOD}(b-a) \qquad \text{Equation (1)}$$

The calibration application 6312 and/or the server-side calibration application 6410 can determine calibration or resultant angle by:

$$r = \text{MOD}(\text{defined angle}-c) \qquad \text{Equation (2)}$$

where the defined angle can be, for example, 30° (7300).

In some implementations, the calibration application 6312 and/or the server-side calibration application 6410 can send instructions associated with the calibration angle to the radar 2400 when the radar 2400 has the actuator 2420 (7400). In some implementations, the actuator 2420 is a stepper motor. The actuator 2420 can move the radar 2400 in accordance with the instructions to align the radar 2400 with the calibration angle. In some implementations, the calibration application 6312 and/or the server-side calibration application 6410 can send instructions associated with the calibration angle to the camera 2200 when the camera 2200 has the actuator 2220. In some implementations, the technician 6300 and/or the remote operator 6600 can receive streaming information or streams from the camera 2200. The technician 6300 and/or the remote operator 6600 can send instructions to the camera 2200 to adjust a focal length when the camera 2200 has the moveable or adjustable lens 2230.

In some implementations, the technician 6300 can connect to the radar 2400 using the wireless communications in the TDU 6200 (7500). The technician 6300 can see, via the calibration application 6312, the angles shown in FIG. 8 including the calibration angle (7600). The technician 6300 can move the radar 2400 until the calibration application 6312 provides confirmation of calibration (7700). In some implementations, the confirmation can be a visual alert, generated by the calibration application 6312 on the mobile device 6310, which shows alignment. In some implementations, the confirmation can be an audible alert, generated by the calibration application 6312 via the mobile device 6310, which signals alignment. In some implementations, the technician 6300 can connect to the camera 2200 using the wireless communications in the TDU 6200. The technician 6300 can move the camera 2200 until the calibration application 6312 provides confirmation of calibration. In some implementations, the confirmation can be a visual alert, generated by the calibration application 6312 on the mobile device 6310, which shows alignment. In some implementations, the confirmation can be an audible alert, generated by the calibration application 6312 via the mobile device 6310, which signals alignment. In some implementations, the technician 6300 can receive streaming information or streams from the camera 2200. The technician 6300 and/or the remote operator 6600 can adjust the focal length of the 2230 until focused as seen on the mobile device 6310.

The train detection apparatus 6210 is complete upon setting of the radar 2400, the camera 2200, and the focal length of the camera 2200 (7800).

In some implementations, the technician 6300 and/or the remote operator 6600 can monitor and/or receive alerts via the calibration application 6312 or the server-side calibration application 6410, respectively, that one or more of the radar 2400 or the camera 2200 is out of adjustment (7900). One or more of the above steps can be repeated until calibration is completed. The focal length of the camera 2200 can also be realigned if out of focus.

Figure 10:
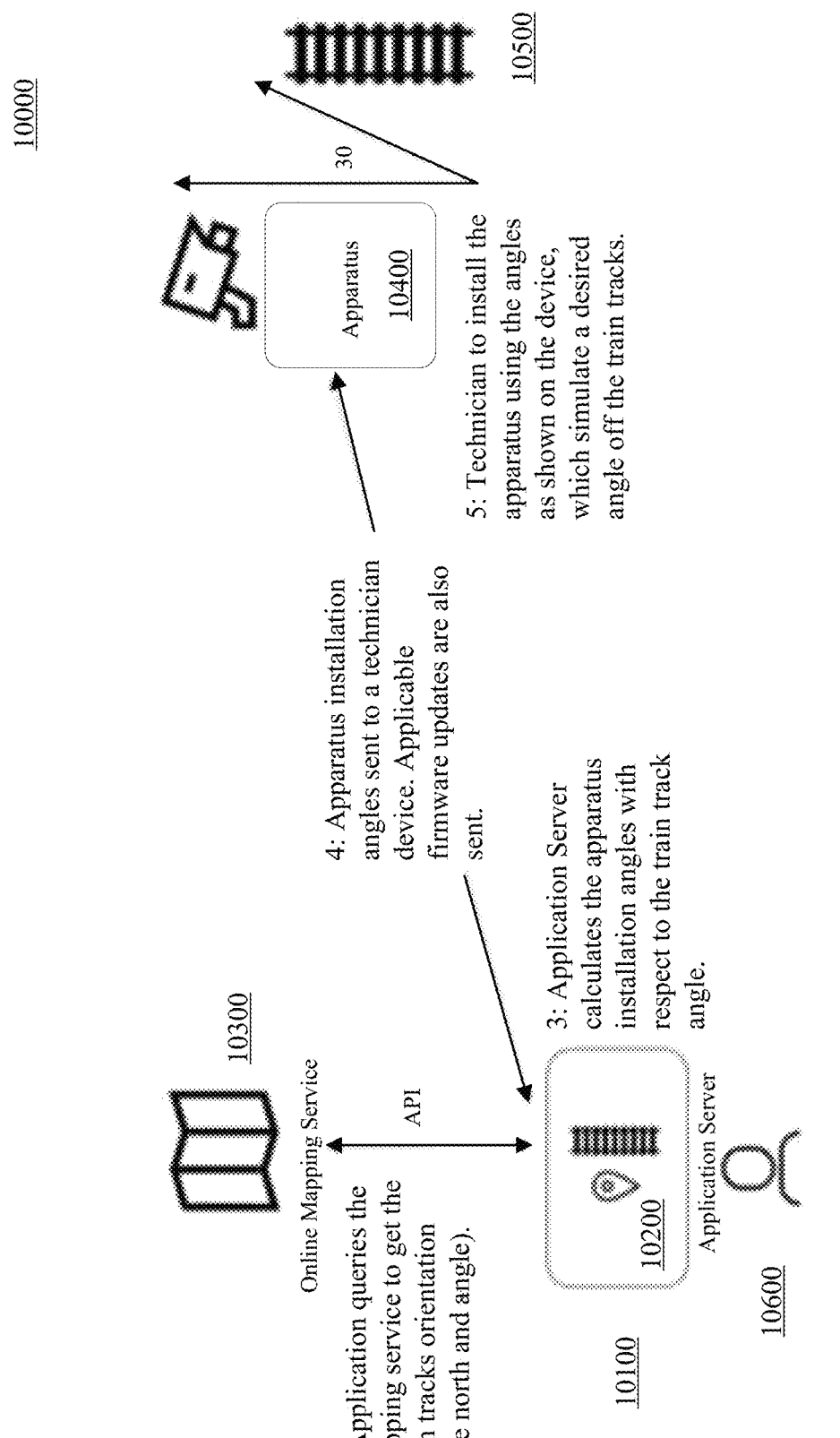
FIG. 10 is a flow block diagram for a method of installation of train detection apparatus in accordance with embodiments of this disclosure.

FIG. 10 is a flow block diagram of a method 10000 for installation of train detection apparatus in accordance with embodiments of this disclosure. The method 10000 is executed among and between an application server 10100 running an application 10200, a mapping service 10300, a train detection apparatus 10400, a train track 10500, and a user/technician device 10600. In some implementations, the train detection apparatus 10500 can include a radar and a camera.

A user 1600 can enter a location of where the train detection apparatus 10400 is to be installed (1). The application 10200, via an API call, can query the mapping service 10300 to get an image of the location with the train track 10500 and determine a train track angle with respect to true north (2). Although the use of true north is described herein, another designated or defined reference angle can be used. The application 10200 can calculate the train detection apparatus installation angle with respect to the train track angle (3). The application 10200 can send the train detection apparatus installation angle to the technician device 10600 and can send firmware updates to the train detection apparatus 10400 (4). The technician 10600 can use a technician device, which shows the train detection apparatus installation angle, to calibrate the train detection apparatus 10400 (5).

FIG. 11 is a flow block diagram of a method 11000 for installation of train detection apparatus in accordance with embodiments of this disclosure. The method 11000 is executed among and between an application server 11100 running an application 11200, a mapping service 11300, a train detection apparatus 11400, a stepper motor 11500 connected to or part of the apparatus 11400, and a train track 11600. In some implementations, the train detection apparatus 10500 can include a radar component and a camera component, where each of the radar component and the camera component can have a stepper motor or be connected to a stepper motor.

A user can enter a location of where the train detection apparatus 11400 is to be installed (1). The application 11200, via an API call, can query the mapping service 11300 to get an image of the location with the train track 11600 and determine a train track angle with respect to true north (2). The application 11200 can calculate the train detection apparatus installation angle with respect to the train track angle (3). The application 11200 can send the train detection apparatus installation angle to the train detection apparatus 11400 and/or the stepper motor 11500, and can send firmware updates to the train detection apparatus 11400 (4). The stepper motor 11500 can use the train detection apparatus installation angle to calibrate the train detection apparatus 11400 (5).

FIG. 12 is a swim diagram for installation of train detection apparatus in accordance with embodiments of this disclosure. The swim diagram describes a method 12000 which is performed amongst and between a user and user device 12100, an application server 12200, a map service 12300, a computer vision model and application 12400, train detection apparatus 12500, a sensor 12600, and a stepper motor 12700. In some implementations, the train detection apparatus 12500 can include a radar and a camera, where each of the radar and the camera can have a stepper motor or be connected to a stepper motor, as appropriate.

The user 12100 can enter a location of where the train detection apparatus 12500 is to be installed (12800). The application server 12200 can obtain a train track image from the map service 12300 (12805). The application server 12200 can query the computer vision model and application 12400 to analyze and determine a train track angle relative to a reference angle (12810). The sensor 12600 can obtain measurement readings, including tilt and angle, from the apparatus 12500 (12815). The application server 12200 can obtain the sensor readings from the sensor 12600 (12820). The application server 12200 can calculate the installation angle based on the train track angle and the sensor readings (12825). The application server 12200 can send the installation angle to the apparatus 12500 (12830). The apparatus 12500 can send the installation angle to the stepper motor 12700 to calibrate the apparatus 12500 (12835). In some implementations, a procedure can be performed between the user and user device 12100 and a camera component of the apparatus 12500 to adjust a moveable lens of the camera component.

Figure 13:
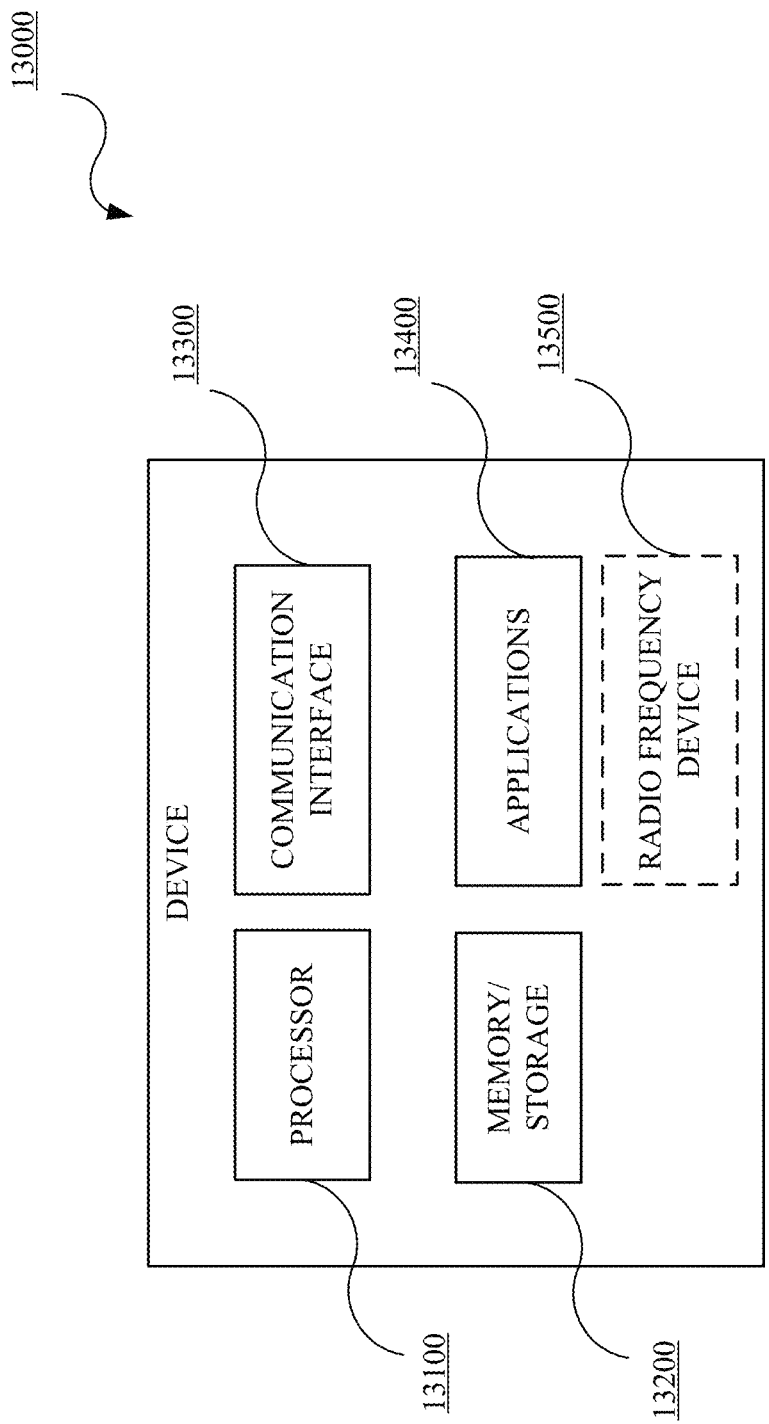
FIG. 13 is a diagram of an example device in accordance with embodiments of this disclosure.

FIG. 13 is a block diagram of an example of a device 13000 in accordance with embodiments of this disclosure. The device 13000 can include, but is not limited to, a processor 13100, a memory/storage 13200, a communication interface 13300, applications 13400, and a radio frequency (RF) device 13500, as appropriate and applicable. The device 13000 can include or implement, for example, the TDUs 1100, the train detection control center 1200, the TDU 2000, the train detection apparatus 4000, the TDU 6200, the train detection apparatus 6210, parts of the cloud platform 6400, the processor and display 6510, the device 6310, the application server 10100, the mapping service 10300, the train detection apparatus 10500, the user/technician device 10700, the application server 11100, the mapping service 11300, the train detection apparatus 11500, the stepper motor 11600, the user and user device 12100, the application server 12200, the map service 12300, the computer vision model and application 12400, the train detection apparatus 12500, the sensor 12600, and the stepper motor 12700, as appropriate and applicable. In an implementation, the memory/storage 13200 may store the location, image, angles, calibration, resultant, and/or installation angle, sensor measurements, and the like. The applications 13400 can include the computer vision model, the calibration application, and the like. The applicable or appropriate techniques or methods as described herein may be stored in the memory/storage 13200 and executed by the processor 13100 in cooperation with the memory/storage 13200, the communications interface 13300, the applications 13400, and the RF device 13500 as applicable and appropriate. The device 13000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

FIG. 14 is a flowchart of an example method 14000 for automated angle calibration in accordance with embodiments of this disclosure. The method 14000 includes: determining 14100 a reference object angle of a reference object with respect to a reference angle from an image; determining 14200 an installation object angle of an installation object with respect to the reference angle; determining 14300 a calibration angle between the reference object and the installation object based on the reference object angle and the installation object angle; aligning 14400 the installation object to the calibration angle. For example, the method 14000 may be implemented, as applicable and appropriate, by the TDUs 1100, the train detection control center 1200, the TDU 2000, the train detection apparatus 4000, the TDU 6200, the train detection apparatus 6210, parts of the cloud platform 6400, the processor and display 6510, the device 6310, the application server 10100, the mapping service 10300, the train detection apparatus 10500, the user/technician device 10700, the application server 11100, the mapping service 11300, the train detection apparatus 11500, the stepper motor 11600, the user and user device 12100, the application server 12200, the map service 12300, the computer vision model and application 12400, the train detection apparatus 12500, the sensor 12600, the stepper motor 12700, the device 13000, the processor 13100, the memory/storage 13200, the communication interface 13300, the applications 13400, and/or the RF device 13500, as appropriate and applicable.

The method 14000 includes determining 14100 a reference object angle of a reference object with respect to a reference angle from an image. An image is captured of an installation site where an installation object is to be installed relative to a reference object. An angle between the installation object and the reference object is a defined value for operability and functionality of the installation object with respect to the reference object or activity related to the reference object. In some implementations, the installation object is also installed a defined height above or relative to the reference object. The image can be processed using computer vision models to determine a location or position of the reference object and the reference object angle. For example, the reference angle can be true north. Once an installation site is entered into a calibration system and/or application, the calibration system and/or application can automatically determine the reference object angle.

The method 14000 includes determining 14200 an installation object angle of an installation object with respect to the reference angle. After initial installation of the installation object, for example on a structure in proximity to the reference object, sensors integrated with or connected to the installation object can provide sensor measurements for tilt, angle, and the like. Once the installation object is installed, the calibration system and/or application can automatically determine the installation object angle.

The method 14000 includes determining 14300 a calibration angle between the reference object and the installation object based on the reference object angle and the installation object angle. The calibration system and/or application can automatically determine the calibration angle as both the reference object angle and the installation object angle are relative to the reference angle.

The method 14000 includes aligning 14400 the installation object to the calibration angle. The calibration system and/or application can automatically send the calibration angle to either a technician equipped with a device or to the installation object and/or to actuators connected to or integrated with the installation object to align the installation object to the calibration angle using actuators connected to the installation object. In the instance the calibration angle is sent to the technician equipped with a device, the device an automatically display the calibration angle and/or other angles, as appropriate. The technician can adjust the installation object and the device (using the calibration system and/or application) can automatically update the display accordingly and provide an alert when alignment is complete. In the instance the calibration angle is sent to the installation object and/or the actuators, the actuators can automatically move or adjust the installation object in alignment with the calibration angle. In some implementations, where the installation object is a camera and has an adjustable focal or optical component, focal length can be automatically adjusted using streaming data sent to the calibration system and/or application, which is then displayed to the technician on the device or to a user at a remote location. In some implementations, the sensors can automatically provide updated installation object angles to the calibration system and/or application so that alignment can be checked. The installation object can be automatically realigned if unaligned using the actuators. In the event of no actuators, a technician equipped with the device can realign the installation object as described herein.

The described methods and systems for a train detection system with apparatus installation can include, but is not limited to, a train detection apparatus configured for installation at an installation site at a defined angle with respect to railroad tracks, and a processor configured to execute a method for aligning the train detection apparatus to the defined angle. The processor configured to determine a railroad tracks angle with respect to a reference angle based on an image captured of the installation site, obtain, from a sensor, a train detection apparatus angle with respect to the reference angle, determine an alignment angle based on the railroad tracks angle and the train detection apparatus angle, and send the alignment angle to substantially align the train detection apparatus to the railroad tracks in accordance with the defined angle.

In some implementations, the train detection apparatus includes an actuator. The actuator configured to receive, from the processor, the alignment angle, and adjust an angle of the train detection apparatus based on the alignment angle to substantially align with the defined angle. In some implementations, the train detection apparatus is a radar and the actuator is a stepper motor, the radar configured to be installed at a defined height. In some implementations, the train detection apparatus includes a radar which is equipped with a stepper motor, the stepper motor configured to adjust an angle of the radar based on the alignment angle to substantially align with the defined angle. In some implementations, the train detection apparatus includes a camera which is equipped with a camera stepper motor, the camera stepper motor configured to adjust an angle of the camera based on the alignment angle to substantially align with the defined angle. In some implementations, the camera includes an adjustable lens and wherein a device configured for use by a technician is configured to receive, from the processor, a camera stream, display camera stream to the technician, and send commands to adjust the adjustable lens for focal alignment. In some implementations, the defined angle is substantially 30°. In some implementations, the processor is further configured to convert the image to a greyscale image, draw lines using collinear points detected in the greyscale image using a defined threshold, and detect the railroad tracks based on drawn lines. In some implementations, the defined threshold is adjusted if a number of drawn lines is greater than a defined value. In some implementations, a device configured for use by a technician is configured to receive, from the processor, the alignment angle, display at least the alignment angle to the technician, and indicate substantial alignment when the train detection apparatus is moved based on the displayed alignment angle. In some implementations, an indication can be at least one of a visible indicator or an audible indicator.

The described methods and systems for a train detection system with apparatus installation can include, but is not limited to, a method for angle alignment. The method including determining, by a processor, a train tracks angle with respect to a defined angle based on an image captured of an installation site, obtaining, from a sensor for an apparatus, an apparatus angle with respect to the defined angle, determining, by the processor, a calibration angle based on the train tracks angle and the apparatus angle, and sending, by the processor, the calibration angle to align the apparatus to the train tracks to substantially match the defined angle.

In some implementations, an actuator adjusts an angle of the apparatus based on the calibration angle. In some implementations, the apparatus includes a radar installed at defined height and the actuator is a stepper motor. In some implementations, the apparatus includes a camera which is equipped with a camera stepper motor which adjusts an angle of the camera based on the calibration angle. In some implementations, the method further includes receiving, at the processor, a camera stream, displaying, by the processor, the camera stream to a technician, and sending, by the processor, commands to adjust an adjustable lens for focal alignment. In some implementations, the method further includes displaying, by the processor, the calibration angle to a technician, and indicating, by the processor, substantial alignment when the apparatus is moved based on the displayed calibration angle. In some implementations, the method further includes converting, by the processor, the image to a greyscale image, generating, by the processor, lines using collinear points detected in the greyscale image using a defined threshold, and detecting, by the processor, train tracks based on drawn lines. In some implementations, the method further includes receiving, from the sensor by the processor, updated apparatus angles, and repeating, by the processor, when the apparatus is out of alignment in accordance with the defined angle.

The described methods and systems for a train detection system with apparatus installation can include, but is not limited to, a method for angle alignment. The method including determining, by a processor, a reference object angle of a reference object with respect to a reference angle from an image, determining, by the processor, an installation object angle of an installation object with respect to the reference angle, determining, by the processor, a calibration angle between the reference object and the installation object based on the reference object angle and the installation object angle; and sending, by the processor, the calibration angle to align the installation object.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java® (which is a high-level, general-purpose, memory-safe, object-oriented programming language), Smalltalk, C++or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A train detection system comprising:
   a train detection apparatus configured for installation at an installation site at a defined angle with respect to railroad tracks; and
   a processor configured to:
   determine a railroad tracks angle with respect to a reference angle based on an image captured of the installation site;
   obtain, from a sensor, a train detection apparatus angle with respect to the reference angle;
   determine an alignment angle based on the railroad tracks angle and the train detection apparatus angle; and
   send the alignment angle to the train detection apparatus to substantially align the train detection apparatus to the railroad tracks in accordance with a defined angle.

2. The train detection system of claim 1, wherein the train detection apparatus includes an actuator, the actuator configured to:
   receive, from the processor, the alignment angle; and
   adjust an angle of the train detection apparatus based on the alignment angle to substantially align with the defined angle.

3. The train detection system of claim 2, wherein the train detection apparatus is a radar and the actuator is a stepper motor, the radar configured to be installed at a defined height.

4. The train detection system of claim 1, wherein the train detection apparatus includes a radar which is equipped with a stepper motor, the stepper motor configured to adjust an angle of the radar based on the alignment angle to substantially align with the defined angle.

5. The train detection system of claim 4, wherein the train detection apparatus includes a camera which is equipped with a camera stepper motor, the camera stepper motor configured to adjust an angle of the camera based on the alignment angle to substantially align with the defined angle.

6. The train detection system of claim 5, wherein the camera includes an adjustable lens and wherein a device configured for use by a technician is configured to:
   receive, from the processor, a camera stream;
   display camera stream to the technician; and
   send commands to adjust the adjustable lens for focal alignment.

7. The train detection system of claim 4, wherein the defined angle is substantially 30°.

8. The train detection system of claim 1, wherein the processor is further configured to:
   convert the image to a greyscale image;
   draw lines using collinear points detected in the greyscale image using a defined threshold; and
   detect the railroad tracks based on drawn lines.

9. The train detection system of claim 8, wherein the defined threshold is adjusted if a number of drawn lines is greater than a defined value.

10. The train detection system of claim 1, wherein a device configured for use by a technician is configured to:
    receive, from the processor, the alignment angle;
    display at least the alignment angle to the technician; and
    indicate substantial alignment when the train detection apparatus is moved based on the displayed alignment angle.

11. The train detection system of claim 10, wherein an indication can be at least one of a visible indicator or an audible indicator.

12. A method for providing a calibration angle, the method comprising:
    determining, by a processor, a train tracks angle with respect to a defined angle based on an image captured of an installation site;
    obtaining, from a sensor for an apparatus, an apparatus angle with respect to the defined angle;
    determining, by the processor, a calibration angle based on the train tracks angle and the apparatus angle; and
    sending, by the processor, the calibration angle to align the apparatus to the train tracks to substantially match the defined angle.

13. The method of claim 12, wherein an actuator adjusts an angle of the apparatus based on the calibration angle.

14. The method of claim 13, wherein the apparatus includes a radar installed at defined height and the actuator is a stepper motor.

15. The method of claim 14, wherein the apparatus includes a camera which is equipped with a camera stepper motor which adjusts an angle of the camera based on the calibration angle.

16. The method of claim 15, further comprising:
    receiving, at the processor, a camera stream;
    displaying, by the processor, the camera stream to a technician; and
    sending, by the processor, commands to adjust an adjustable lens for focal alignment.

17. The method of claim 13, further comprising:
    displaying, by the processor, the calibration angle to a technician; and
    indicating, by the processor, substantial alignment when the apparatus is moved based on the displayed calibration angle.

18. The method of claim 13, further comprising:
- converting, by the processor, the image to a greyscale image;
- generating, by the processor, lines using collinear points detected in the greyscale image using a defined threshold; and
- detecting, by the processor, train tracks based on drawn lines.

19. The method of claim 13, further comprising:
- receiving, from the sensor by the processor, updated apparatus angles; and
- repeating, by the processor, when the apparatus is out of alignment in accordance with the defined angle.

20. A method for providing a calibration angle angle alignment, the method comprising:
- determining, by a processor, a reference object angle of a reference object with respect to a reference angle from an image;
- determining, by the processor, an installation object angle of an installation object with respect to the reference angle;
- determining, by the processor, a calibration angle between the reference object and the installation object based on the reference object angle and the installation object angle; and
- sending, by the processor, the calibration angle to align the installation object.

* * * * *